US008660798B2

(12) United States Patent
Wang (10) Patent No.: US 8,660,798 B2
(45) Date of Patent: Feb. 25, 2014

(54) SYSTEM AND METHOD FOR ATTENUATING ALIASING IN SEISMIC DATA CAUSED BY ACQUISITION GEOMETRY

(75) Inventor: Yue Wang, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1037 days.

(21) Appl. No.: 12/712,450

(22) Filed: Feb. 25, 2010

(65) Prior Publication Data

US 2011/0205846 A1    Aug. 25, 2011

(51) Int. Cl.
*G01V 1/36* (2006.01)

(52) U.S. Cl.
CPC .......... *G01V 1/364* (2013.01); *G01V 2210/242* (2013.01); *G01V 2210/522* (2013.01); *G01V 2210/514* (2013.01); *G01V 2210/671* (2013.01)
USPC .............................................. 702/17; 367/43

(58) Field of Classification Search
CPC ............ G01V 1/364; G01V 2210/242; G01V 2210/522; G01V 2210/514; G01V 2210/671
USPC .............................................. 702/17; 367/43
See application file for complete search history.

(56) References Cited

U.S. PATENT DOCUMENTS

| | | | | | |
|---|---|---|---|---|---|
| 3,284,763 | A | * | 11/1966 | Burg et al. | 367/45 |
| 3,363,229 | A | * | 1/1968 | Pound et al. | 367/43 |
| 3,613,071 | A | * | 10/1971 | Quay | 367/20 |
| 4,092,629 | A | * | 5/1978 | Siems et al. | 367/79 |
| 4,330,872 | A | * | 5/1982 | Bratton | 367/43 |
| 4,393,484 | A | * | 7/1983 | Buchanan et al. | 367/23 |
| 4,797,861 | A | * | 1/1989 | Beasley | 367/50 |
| 4,809,235 | A | * | 2/1989 | Dragoset, Jr. | 367/21 |
| 5,005,418 | A | * | 4/1991 | Anderson | 73/625 |
| 5,924,049 | A | * | 7/1999 | Beasley et al. | 702/17 |
| 6,021,379 | A | * | 2/2000 | Duren et al. | 702/16 |
| 6,112,155 | A | * | 8/2000 | Pham | 702/14 |
| 7,095,678 | B2 | * | 8/2006 | Winbow et al. | 367/73 |
| 7,835,223 | B2 | * | 11/2010 | Goujon | 367/21 |
| 2008/0294346 | A1 | * | 11/2008 | Nemeth et al. | 702/17 |
| 2009/0316527 | A1 | * | 12/2009 | Stewart et al. | 367/24 |
| 2011/0103185 | A1 | * | 5/2011 | Hill et al. | 367/53 |

OTHER PUBLICATIONS

Hill et al., Salt-Flank Imaging Using Gaussian Beam Migration, Downloaded Nov. 2, 2009.
N. Ross Hill, Prestack Gaussian-beam depth migration, Geophysics, Jul.-Aug. 2001, pp. 1240-1250, vol. 66, No. 4, Society of Exploration Geophysicists.
Canning et al., Regularizing 3-D data sets with DMO, Geophysics, Jul.-Aug. 1996, pp. 1103-1114, vol. 61, No. 4, Society of Exploration Geophysicists.
Biondi et al., Azimuth moveout for 3-D prestack imaging, Geophysics, Mar.-Apr. 1998, pp. 574-588, vol. 63, No. 2, Society of Exploration Geophysicists.

* cited by examiner

*Primary Examiner* — Mark Hellner
*Assistant Examiner* — Ari M Diacou
(74) *Attorney, Agent, or Firm* — Marie L. Clapp (57) ABSTRACT

Seismic data representing the propagation of seismic energy through a geologic volume of interest is processed. The seismic energy propagates through the geologic volume of interest from one or more source locations at or near the geologic volume of interest to one or more detector locations at or near the geologic volume of interest. In processing the seismic data, the seismic energy is modeled as beams (e.g., Gaussian beams). The processing includes determining a filter for the seismic data that attenuates aliasing which may be present in the seismic data due to spacing between detector locations.

15 Claims, 7 Drawing Sheets

SYSTEM AND METHOD FOR ATTENUATING ALIASING IN SEISMIC DATA CAUSED BY ACQUISITION GEOMETRY

FIELD OF THE INVENTION

The invention relates to attenuating aliasing in seismic data caused by detector spacing.

BACKGROUND OF THE INVENTION

Seismic data is generally acquired by sending seismic energy into a geologic volume of interest with a "shot," and then recording seismic energy at a plurality of detectors arranged near the source. The plurality of detectors are typically arranged at a meshpoints of a regular, predetermined mesh. For a given event within the geologic volume of interest, there is a maximum frequency above which aliasing is present by virtue of detector spacing. Conventional techniques for attenuating such aliasing may not be sufficient or usable in the common shot domain, where large offset data is often implemented in stacked traces of seismic data.

SUMMARY OF THE INVENTION

One aspect of the invention relates to a method of de-aliasing seismic data, wherein the method is implemented in a computer system having one or more processors configured to execute one or more computer program modules. In one embodiment, the method includes (a) obtaining a first trace of seismic data representing the propagation of seismic energy through a geological volume of interest from a source positioned at a single source location to detectors positioned at detector locations spaced apart according to a detector spacing, the first trace of seismic data further representing a plurality of detector beam arrivals as a function of time; (b) determining a midpoint dip corresponding to at least one detector beam arrival represented in the first trace of seismic data, wherein the midpoint dip is determined based on arrival time of the at least one detector beam arrival; and (c) determining a filter to be applied to the trace of seismic data to remove frequencies of seismic energy from the first trace of seismic data that have been aliased by the detector spacing, the filter being determined based on the midpoint dip corresponding to the at least one beam arrival and the detector spacing.

Another aspect of the invention relates to a system configured to de-alias seismic data. In one embodiment, the system has one or more processors configured to execute computer program modules. In one embodiment, the computer program modules include a data module, a midpoint dip module, and a filter determination module. The data module is configured to obtain traces of seismic data including a first trace of seismic data representing the propagation of seismic energy through a geological volume of interest from a source positioned at a single source location to detectors positioned at detector locations spaced apart according to a detector spacing, the first trace of seismic data further representing a plurality of detector beam arrivals as a function of time. The midpoint dip module is configured to determine a midpoint dip corresponding to the at least one detector beam arrival represented in the first trace of seismic data, the midpoint dip module being configured to determine midpoint dip based on arrival time. The filter determination module is configured to determine a filter to be applied to the first trace of seismic data to remove frequencies of seismic energy that have been aliased by the detector spacing, the filter determination module being configured to determine the filter based on the midpoint dip corresponding to the at least one beam arrival and the detector spacing.

The filter determined by the system and method described herein reduces, attenuates, and/or eliminates aliasing caused by the spacing between detector locations during seismic acquisition when seismic data is used to model the propagation of beams of seismic energy through a geologic volume of interest. Among other things, this may reduce and/or eliminate artifacts present in images of the geologic volume of interest formed based on the modeled beams of seismic energy.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processor computer processors system, hand-held devices, programmable consumer electronics, mini-computers, mainframe computers, and the like. The invention may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

Figure 1:
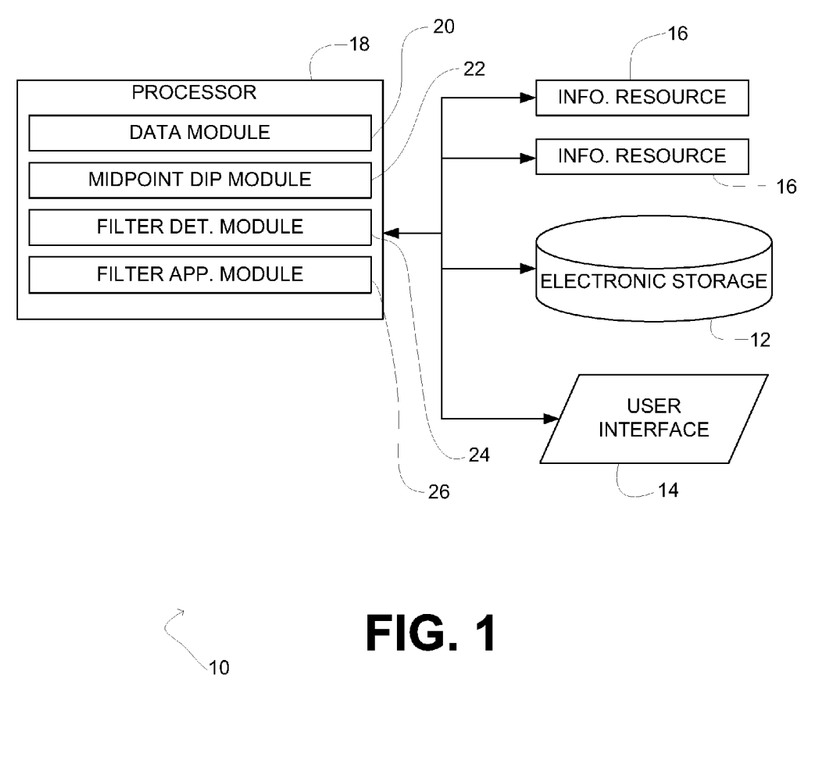
FIG. 1 illustrates a system configured to process seismic data representing the propagation of seismic energy through a geologic volume of interest, in accordance with one or more embodiments of the invention.

FIG. 1 illustrates a system 10 configured to process seismic data representing the propagation of seismic energy through a geologic volume of interest. The seismic energy propagates through the geologic volume of interest from one or more source locations at or near the geologic volume of interest to one or more detector locations at or near the geologic volume of interest. In processing the seismic data, system 10 models the seismic energy as beams (e.g., Gaussian beams). The processing performed by system 10 includes determining a filter for the seismic data that reduces, attenuates, and/or eliminates aliasing which may be present in the seismic data due to spacing between detector locations. The system 10 may apply the filter to the seismic data to attenuate aliasing effects that may cause artifacts and/or other inaccuracies during imaging and other subsequent processing. In one embodiment, system 10 comprises electronic storage 12, a user interface 14, one or more information resources 16, one or more processors 18, and/or other components.

In one embodiment, electronic storage 12 includes electronic storage media that electronically stores information. The electronic storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor 18, information received via user interface 14, information received from information resources 16, and/or other information that enables system 10 to function properly. Electronic storage 12 may be a separate component within system 10, or electronic storage 12 may be provided integrally with one or more other components of system 10 (e.g., processor 18).

User interface 14 is configured to provide an interface between system 10 and a user through which the user may provide information to and receive information from system 10. This enables data, results, and/or instructions and any other communicable items, collectively referred to as "information," to be communicated between the user and the system 10. As used herein, the term "user" may refer to a single individual or a group of individuals who may be working in coordination. Examples of interface devices suitable for inclusion in user interface 14 include a keypad, buttons, switches, a keyboard, knobs, levers, a display screen, a touch screen, speakers, a microphone, an indicator light, an audible alarm, and a printer. In one embodiment, user interface 14 actually includes a plurality of separate interfaces.

It is to be understood that other communication techniques, either hard-wired or wireless, are also contemplated by the present invention as user interface 14. For example, the present invention contemplates that user interface 14 may be integrated with a removable storage interface provided by electronic storage 12. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

The information resources 16 include one or more sources of information related to the geologic volume of interest and/or the process of generating an image of the geologic volume of interest. By way of non-limiting example, one of information resources 16 may include seismic data acquired at or near the geologic volume of interest, information derived therefrom, and/or information related to the acquisition. The seismic data may include individual traces of seismic data, or the data recorded at on one channel of seismic energy propagating through the geologic volume of interest from a source. The information derived from the seismic data may include, for example, a velocity model, beam properties associated with beams used to model the propagation of seismic energy through the geologic volume of interest, Green's functions associated with beams used to model the propagation of seismic energy through the geologic volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geologic volume of interest, and/or other information.

Processor 18 is configured to provide information processing capabilities in system 10. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device or computing platform, or processor 18 may represent processing functionality of a plurality of devices operating in coordination.

As is shown in FIG. 1, processor 18 may be configured to execute one or more computer program modules. The one or more computer program modules may include one or more of a data module 20, a midpoint dip module 22, a filter determination module 24, a filter application module 26, and/or other modules. Processor 18 may be configured to execute modules 20, 22, 24, and/or 26 by software; hardware; firmware; some combination of software, hardware, and/or firmware; and/or other mechanisms for configuring processing capabilities on processor 18.

It should be appreciated that although modules 20, 22, 24, and 26 are illustrated in FIG. 1 as being co-located within a single processing unit, in implementations in which processor 18 includes multiple processing units, one or more of modules 20, 22, 24, and/or 26 may be located remotely from the other modules. The description of the functionality provided by the different modules 20, 22, 24, and/or 26 described below is for illustrative purposes, and is not intended to be limiting, as any of modules 20, 22, 24, and/or 26 may provide more or less functionality than is described. For example, one or more of modules 20, 22, 24, and/or 26 may be eliminated, and some or all of its functionality may be provided by other ones of modules 20, 22, 24, and/or 26. As another example, processor 18 may be configured to execute one or more additional modules that may perform some or all of the functionality attributed below to one of modules 20, 22, 24, and/or 26.

The data module 20 is configured to obtain traces of seismic data through the geological volume of interest. A given trace of seismic data obtained by data module 20 represents, as a function of time, arrivals of detector beams of seismic energy from a single shot of seismic energy from a seismic energy source arriving at a detector location at different arrival times with a specific detector dip. Detector dip of the given trace is the angle with respect to the horizontal at which the detector beam arrivals included in the given trace arrive at the detector location.

Figure 2:
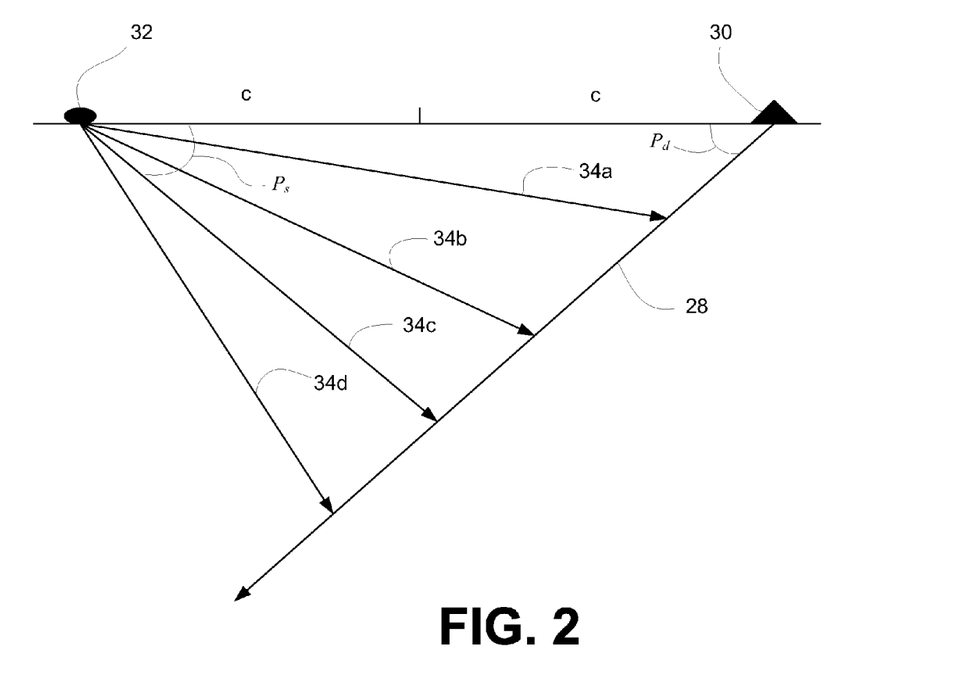
FIG. 2 illustrates the propagation of seismic energy through a geologic volume of interest, according to one or more embodiments of the invention.

By way of non-limiting illustration, FIG. 2 depicts a detector beam path 28 along which detector beams arrive at a detector location of a detector 30. The detector beam path 28 has a detector dip of $P_d$. The detector beams that arrive at detector 30 along detector beam path 28 include detector beams that correspond to a plurality of source beams 34 (shown in FIG. 2 as source beam 34a, source beam 34b, source beam 34c, and source beam 34d) of seismic energy from a source 32. The source beams 34 propagate through the geologic volume of interest from source 32. Events (e.g., surfaces) within the geologic volume cause the seismic energy associated with source beams 34 to move onto detector beam path 28 at some point, and to arrive at detector 30 as detector beam arrivals represented in a trace corresponding to detector 30 and the detector dip $P_d$.

Each of the detector beam arrivals corresponding to source beams 34 has its own arrival time. The arrival time of a given detector beam arrival is a function of the path through the geologic volume of interest by the seismic energy associated with the given detector beam arrival, and the velocity of the seismic energy associated with the given detector beam arrival through the geologic volume of interest. The trace of seismic data recorded at detector 30 will represent seismic energy received at detector 30 as a function of time. The arrival times of the detector beam arrivals represented by the trace of seismic data can be discerned based on the representation of seismic energy as a function of time.

Returning to FIG. 1, the traces of seismic data obtained by data module 20 include stacked data. This means that an individual one of the traces includes an aggregation of traces of seismic data actually recorded at the geologic volume of interest. The traces are aggregated (e.g., added, averaged, etc.) to reduce noise and improve overall data quality. In one embodiment, the traces of seismic data obtained by data module 20 are stacked in the common shot domain. This refers to traces formed by stacking traces of seismic data recorded, at a plurality of detector locations, during one or more shots of seismic energy generated from the same source location.

In one embodiment, data module 20 is configured to obtain stacked traces of seismic data that have been previously generated (e.g., through a stacking process). The data module 20 may obtain the traces of seismic data from electronic storage 12, from one of information resources 16, and/or from other sources of seismic data. In one embodiment, data module 20 is configured to obtain stacked traces of seismic data by processing seismic data. For example, data module 20 may stack, and/or otherwise process, seismic data to obtain the appropriate stacked traces of seismic data.

The midpoint dip module 22 is configured to determine midpoint dips corresponding to detector beam arrivals represented in the traces of seismic data obtained by data module 20. Midpoint dip of a given detector beam arrival is the sum of the detector dip of the given detector beam arrival and a source dip of a source beam of seismic energy that corresponds to the given detector beam.

By way of illustration, referring again to FIG. 2, source beam 34c is shown as having a source dip $P_s$. The detector beam arrival corresponding to source beam 34c that arrives along detector beam path 28 at detector 30 has a midpoint dip $P_m$ determined according to the following relationship (Equation 1):

$$P_m = P_d + P_s. \tag{1}$$

Returning to FIG. 1, in one embodiment, midpoint dip module 22 is configured to determine midpoint dip of a given detector beam arrival through ray-tracing. In this embodiment, based on the arrival time of the given detector beam arrival and a model of the geologic volume of interest, midpoint dip module 22 is configured to determine a source beam that corresponds to the given detector beam arrival via ray-tracing. Once the source beam has been determined through ray-tracing, the midpoint dip of the given detector beam arrival can be determined based on the detector dip of the trace of seismic data and the source dip of the determined source beam.

Referring back to FIG. 2, from the arrival time of a given detector beam arrival arriving at detector 30 along detector beam path 28, a corresponding one of source beams 34 can be determined. Based on a model of the geologic volume of interest (e.g., a velocity model, etc.) a ray-tracing is performed to identify a source beam that would result in the arrival of a detector beam arrival at detector 30 at the arrival time of the given detector beam arrival. For example, source beam 34c may be determined to correspond to the given detector beam arrival. Once the source beam (e.g., source beam 34c) has been determined by the ray-tracing, then the source dip $P_s$ of the source beam can be used in conjunction with the detector dip $P_d$ to determine the midpoint dip of the given detector beam arrival (see Equation (1) above). This can be repeated for a number of detector beam arrivals within the trace of seismic data.

In one embodiment, rather than using ray-tracing to determine midpoint dip, midpoint dip module 22 determines midpoint dip of at least one detector beam arrival analytically. In this embodiment, midpoint dip module 22 leverages a previously known moveout velocity of an event at or near the geologic volume of interest, and one or more analytical ray-tracing equations to determine midpoint dip. For example, the previously known moveout velocity of a water bottom, and/or other reflector at or near the geologic volume of interest may be used. In addition to the moveout velocity of the event, the arrival time of the event may also be known.

Figure 3:
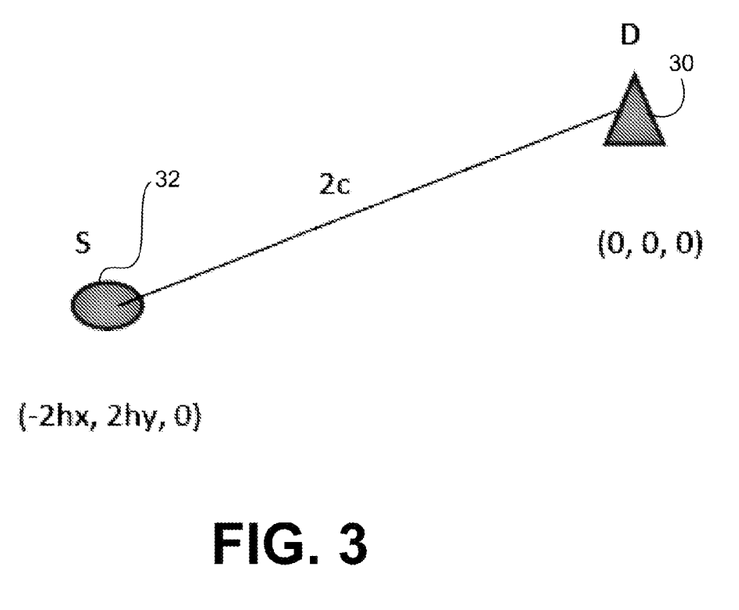
FIG. 3 illustrates a source and detector geometry, according to one or more embodiments of the invention.

FIGS. 3-6 illustrate one set of analytical equations used to determine midpoint dip based on known parameters (e.g., moveout velocity, arrival time, etc.) of an event at or near the geologic volume of interest. FIG. 3 shows a bird's eye view of source 32 and detector 30. As can be seen in FIG. 3, the distance between source 32 and detector 30 is equal to 2c, where c is the offset of the locations of source 32 and detector 30. The location of detector 30 is considered to be the origin (0, 0, 0) of a coordinate system. The coordinates of the location of source 32 are represented as $(-2h_x, 2h_y, 0)$, where $h_x$ and $b_y$ are values for half offsets in the x and y directions.

Figure 4:
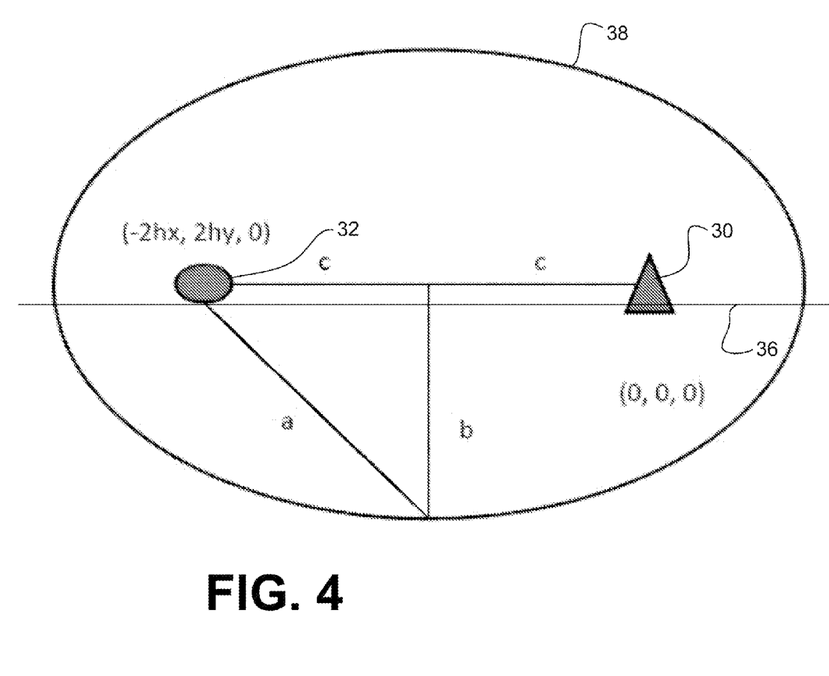
FIG. 4 illustrates a dip moveout ellipse, in accordance with one or more embodiments of the invention.

FIG. 4 shows a side elevation view of the geologic volume of interest with source 32 and detector 30 sitting on a surface 36. FIG. 4 further includes a dip moveout ellipse 38 of an event (e.g., a water bottom, etc.). For a given finite offset (e.g., 2c in FIG. 4), dip moveout ellipse 38, the vertical dimensions are defined by zero-offset traveltime. The zero-offset traveltime is the arrival time from the source straight down to the event corresponding to dip moveout ellipse 38, and back up to the surface. As such, zero-offset traveltime can be expressed as Equation (2):

$$t_0 = \frac{2 * z_0}{v_0}; \quad (2)$$

where $t_0$ represents zero-offset traveltime, $v_0$ represents moveout velocity, and $z_0$ is defined by b in FIG. 4. The horizontal axis of dip moveout ellipse 38 is defined by the finite offset (e.g., 2c). The traveltime at the finite offset can be linked to zero-offset traveltime using a moveout velocity. Thus, by defining a zero-offset time (e.g., through known event depth) and a moveout velocity, dip moveout ellipse 38 is defined for the finite offset shown in FIG. 4.

Figure 5:
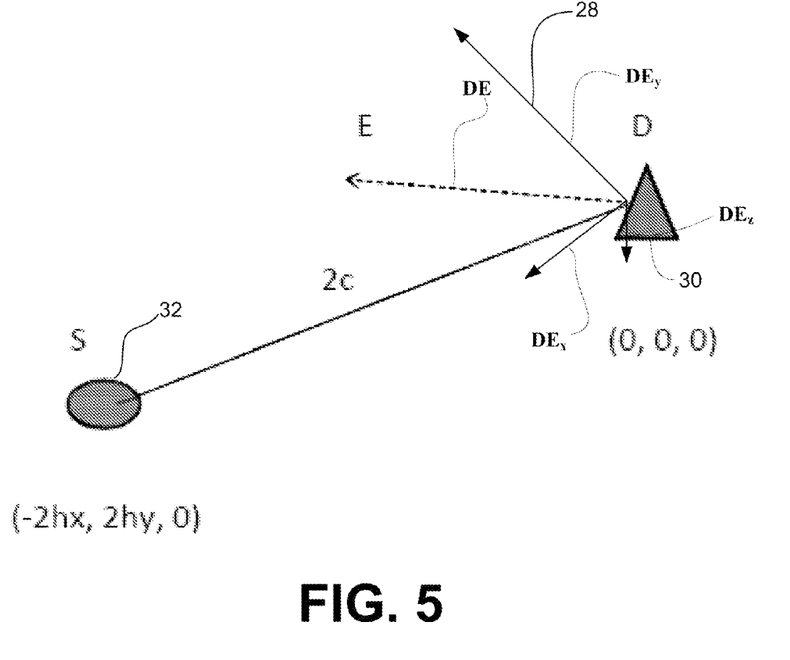
FIG. 5 illustrates a source and detector geometry, according to one or more embodiments of the invention.

FIG. 5 shows a bird's eye view of the geologic volume of interest, including a vector DE traveling along detector beam path 28 into the geologic volume of interest (to the dip moveout ellipse) from the surface at detector 30. As is illustrated in FIG. 5, vector DE includes a component along the x-axis ($DE_x$), a component along the y-axis ($DE_y$), and a component along the z-axis ($DE_z$). The three components of the vector DE extending from detector 30 to the dip moveout ellipse (not shown in FIG. 5), are not independent. The relationship between these parameters can be expressed as Equation (3):

$$DE_x * DE_x + DE_y * DE_y + DE_z * DE_z = \frac{1}{v * v}. \quad (3)$$

Figure 6:
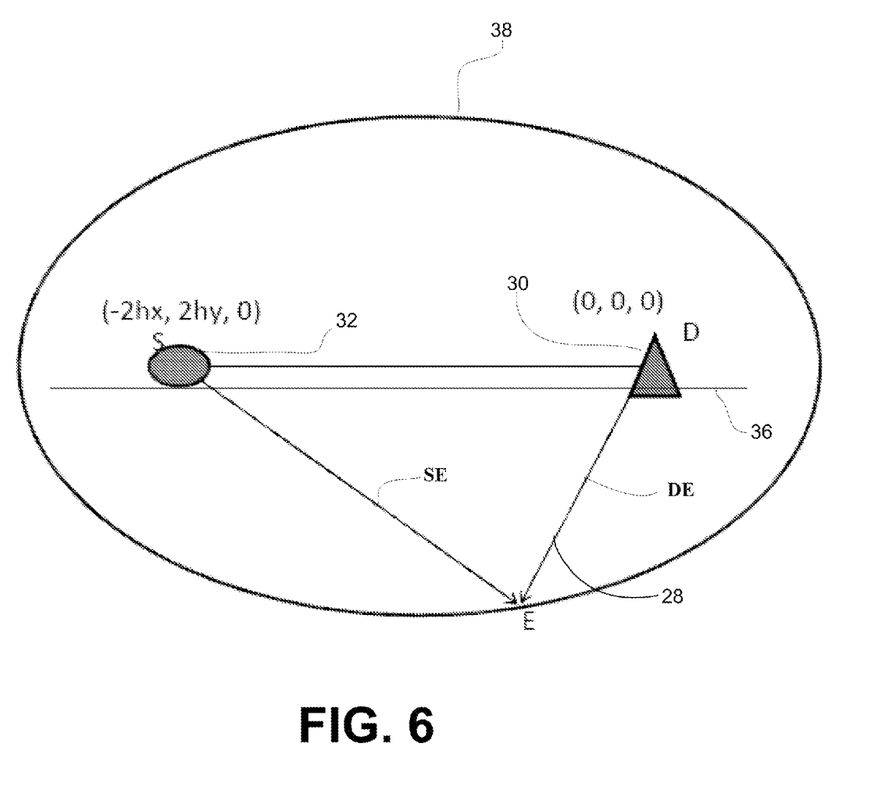
FIG. 6 illustrates a determination of midpoint dip, in accordance with one or more embodiments of the invention.

FIG. 6 shows a side elevation of the geologic volume of interest, with the vector DE extending from detector 30 to dip moveout ellipse 38 along detector beam path 28. It will be appreciated, that if $DE_x$, $DE_y$, and $v$ are known, then the vector DE from detector 30 to the dip moveout ellipse is defined (e.g., Equation (3) can be solved for $DE_z$). Since coordinates of detector 30 and source 32 are known, the angle between the surface and detector beam path 28 (e.g., the detector beam dip of detector beam path 28) is known, and $v_0$ can be used for v, the vector DE is defined.

From the known dip moveout ellipse 38, and the known (or assumed) parameters of the detector beam arrival corresponding to DE, point (labeled E in FIG. 6) on dip moveout ellipse 38 contacted by the detector beam arrival corresponding to DE can be determined through analytical geometric analysis. From this point, a vector SE corresponding to a source beam that travels from source 32 to point E can be determined. The angle between the surface and the vector SE will be the source beam dip for the source beam corresponding to vector SE.

Once the source beam dip for the source beam corresponding to vector SE is known, the source beam dip can be used in conjunction with the detector beam dip of detector beam path 28 to determine midpoint beam dip (e.g., according to the relationship represented in Equation (1)) for the source beam corresponding to SE and the detector beam arrival corresponding to DE. This midpoint dip will be the midpoint dip for the detector beam arrival generated by the event corresponding to dip moveout ellipse 38 that arrives at detector 30 along detector beam path 28.

Returning to FIG. 1, filter determination module 24 is configured to determine filters to be applied to traces of seismic data to attenuate aliasing caused by spacing between detector locations during the acquisition of seismic data. For a given trace of seismic data, the filter determined by filter determination module 24 depends on midpoint dip corresponding to one or more detector beam arrivals represented in the given trace of seismic data (e.g., as determined by midpoint dip module 22), spacing between detector locations, and/or other parameters. By way of non-limiting example, filter determination module 24 may determine a filter for the given trace of seismic data according to the following relationship (Equation (4)):

$$F_{max} = \frac{k}{P_m * d}; \quad (4)$$

where $F_{max}$ represents the maximum frequency passed by the filter, k represents a constant, and d represents the spatial sampling of the locations of the detectors (or a related parameter of acquisition geometry). In one embodiment, d is determined automatically from a previously recorded value for spatial sampling, or the detector spacing. In one embodiment, d is determined based on user selection of a spatial sampling value that specifies the detector spacing.

In embodiments in which midpoint dip module 22 determines midpoint for a plurality of detector beam arrivals represented within a single trace (e.g., through ray-tracing) the filter set forth in Equation (4) will yield a plurality of values for $F_{max}$. In such embodiments, filter determination module 24 is configured to determine the filter as a time variant filter. For example, filter determination module 24 may determine $F_{max}$ for each of the midpoints determined by midpoint dip module 22. Then, using the arrival times corresponding to the determined midpoints, filter determination module 24 may determine $F_{max}$ as a function of arrival time, or $F_{max}(t)$.

The filter application module 26 is configured to apply the filters determined by filter determination module 24 to the appropriate traces of seismic data. This results in the removal of frequencies from the traces of seismic data that have been aliased by detector spacing (e.g., all frequencies above $F_{max}$).

Figure 7:
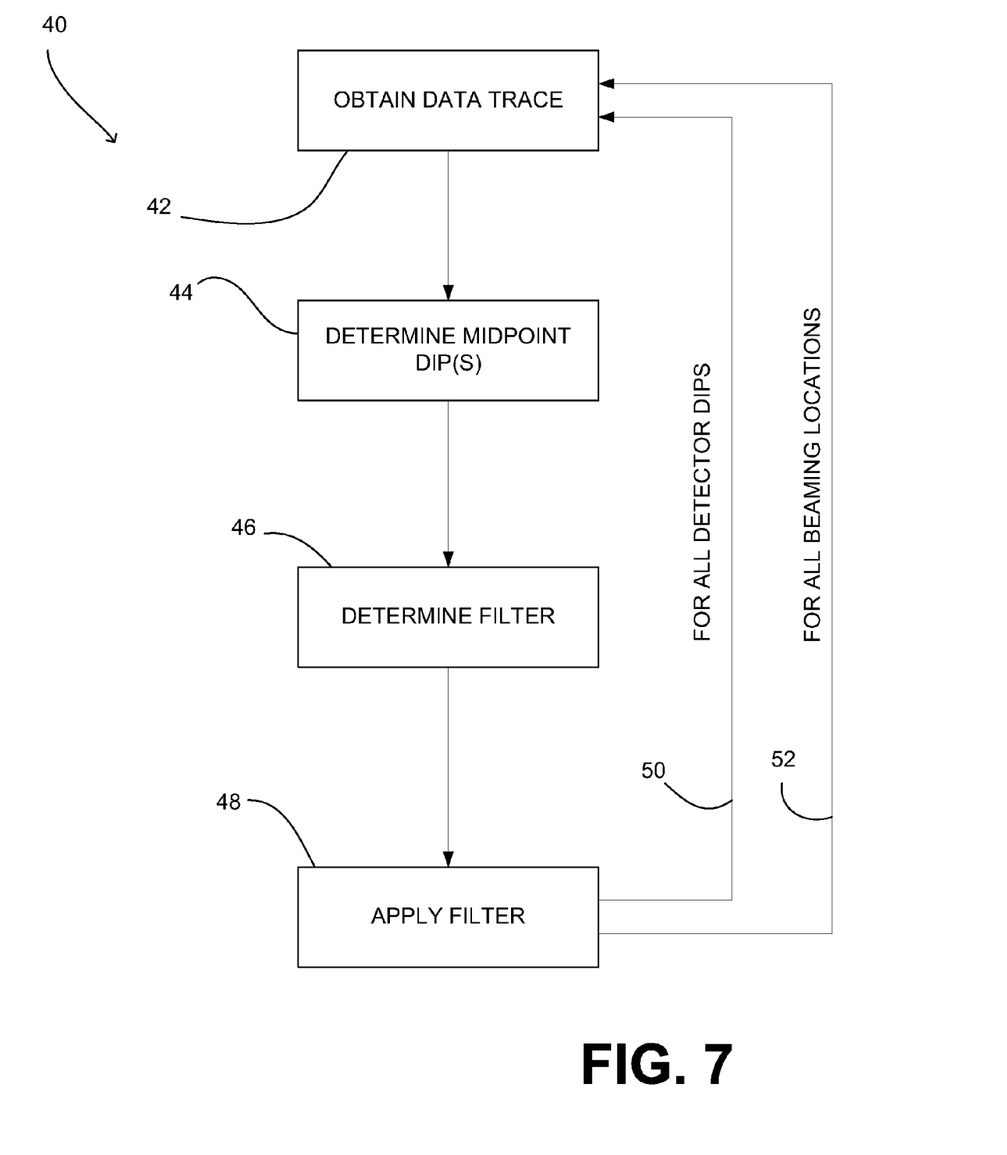
FIG. 7 illustrates a method of processing seismic data representing the propagation of seismic energy through a geologic volume of interest, in accordance with one or more embodiments of the invention.

FIG. 7 illustrates a method 40 of attenuating aliasing in seismic data. The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 7 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, a first trace of seismic data is obtained. The first trace seismic data represents the propagation of seismic energy through a geological volume of interest from a source positioned at a source location to detectors positioned at detector locations spaced apart according to a detector spacing. The first trace of seismic data represents, as a function of time, arrivals of detector beams of seismic energy arriving at a first detector location at different arrival times with a first detector dip at the first detector location. In one embodiment, operation 42 is performed by a data module similar to or the same as data module 20 (shown in FIG. 1 and described above).

At an operation 44, midpoint dip corresponding to at least one detector beam arrival represented in the first trace of seismic data is determined. This may include determining midpoint dip individually for a plurality of detector beam arrivals represented in the first trace of seismic data. Operation 44 may include only determining midpoint dip for a single detector beam arrival in the first trace of seismic data based on a previously known moveout velocity of an event at or near the geologic volume of interest. In one embodiment, operation 44 is performed by a midpoint dip module similar to or the same as midpoint dip module 22 (shown in FIG. 1 and described above).

At an operation 46, a filter for the first trace of seismic data is determined. The filter is applicable to the first trace of seismic data to remove frequencies from the first trace of seismic data that have been aliased by detector spacing. The filter is determined based on midpoint dip(s) determined at operation 44, and based on detector spacing. If midpoint dip has been determined for a plurality of detector beam arrivals at operation 44, operation 46 may include determining a time variant filter. If midpoint dip has been determined for a single detector beam arrival, operation 46 may include determining a filter that is not time variant. In one embodiment, operation 46 is performed by a filter determination module similar to or the same as filter determination module 24 (as shown in FIG. 1 and described above).

At an operation 48, the filter determined at operation 46 is applied to the first trace of seismic data. Application of the filter to the first trace of seismic data results in removal of frequencies from the first trace of seismic data that have been aliased by detector spacing. In one embodiment, operation 38 is performed by a filter application module similar to or the same as filter application module 26 (shown in FIG. 1 and described above).

At a loop 50, operations 42, 44, 46, and 48 are performed for traces of seismic data along all available detector beam dips at the detector location of the first trace. At a loop 52, loop 50 is performed for all available detector beaming locations.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of de-aliasing seismic data, wherein the method is implemented in a computer system having one or more processors configured to execute one or more computer program modules, the method comprising:

(a) obtaining a first trace of seismic data representing the propagation of seismic energy through a geological volume of interest from a source positioned at a single source location to detectors positioned at detector locations spaced apart according to a detector spacing, the first trace of seismic data further representing a plurality of detector beam arrivals as a function of time, and (b) determining a midpoint dip corresponding to at least one detector beam arrival represented in the first trace of seismic data, wherein the midpoint dip is determined based on arrival time of the at least one detector beam arrival;

(c) determining a filter to be applied to the trace of seismic data to remove frequencies of seismic energy from the first trace of seismic data that have been aliased by the detector spacing, the filter being determined based on the midpoint dip corresponding to the at least one beam arrival and the detector spacing;

(d) applying the determined filter to the trace of seismic data; and (e) communicating or storing to a non-transient storage medium, the filtered seismic data.

2. The method of claim 1, wherein the first trace of seismic data corresponds to a first detector location and a first detector dip, and wherein the method further comprises repeating operations (a)-(c) for a second trace of seismic data that represents, as a function of time, arrivals of detector beams of seismic energy from the single shot arriving at the first detector location with a second detector dip.

3. The method of claim 1, further comprising repeating operations (a)-(c) for a second trace of seismic data that represents, as a function of time, arrivals of detector beams of seismic energy from the single shot arriving at a second detector location with a second detector dip at the second detector location.

4. The method of claim 1, further comprising applying the filter to the first trace of seismic data to remove frequencies of seismic energy from the first trace of seismic data that have been aliased by the detector spacing.

5. The method of claim 1, wherein the midpoint determination step comprises determining the midpoint dips corresponding to each of a plurality of detector beam arrivals that arrive at the first detector location at different arrival times and are represented in the first trace of seismic data, and wherein determining the filter comprises determining the filter based on the midpoint dip corresponding to the plurality of detector beam arrivals.

6. The method of claim 5, wherein the filter is a time variant filter.

7. The method of claim 1, wherein the midpoint determination step comprises determining the midpoint dip corresponding to a single detector beam arrival based on a previously known moveout velocity of an event at or near the geologic volume of interest.

8. The method of claim 7, wherein the event at or near the geologic volume of interest is a water bottom.

9. A system configured to de-alias seismic data, the system comprising:
one or more processors configured to execute computer program modules, the computer program modules comprising:
a data module configured to obtain traces of seismic data including a first trace of seismic data representing the propagation of seismic energy through a geological volume of interest from a source positioned at a single source location to detectors positioned at detector locations spaced apart according to a detector spacing, the first trace of seismic data further representing a plurality of detector beam arrivals as a function of time;
a midpoint dip module configured to determine a midpoint dip corresponding to the at least one detector beam arrival represented in the first trace of seismic data, the midpoint dip module being configured to determine midpoint dip based on arrival time; and
a filter determination module configured to determine a filter to be applied to the first trace of seismic data to remove frequencies of seismic energy that have been aliased by the detector spacing, the filter determination module being configured to determine the filter based on the midpoint dip corresponding to the at least one beam arrival and the detector spacing.

10. The system of claim 9, further comprising a filter application module configured to apply the filter to the corresponding first trace of seismic data to remove frequencies of seismic energy from the first trace of seismic data that have been aliased by the detector spacing.

11. The system of claim 9, wherein the midpoint dip module is configured to determine midpoint dips corresponding to multiple detector beam arrivals represented in the first trace of seismic data.

12. The system of claim 11, wherein the filter determination module is configured to determine a time variant filter.

13. The system of claim 9, wherein the midpoint dip module is configured to determine a midpoint dip corresponding to a detector beam arrival represented in the first trace of seismic data based on a previously known moveout velocity of an event at or near the geologic volume of interest.

14. The system of claim 13, wherein the event at or near the geologic volume of interest is a water bottom.

15. The system of claim 9, wherein the detector beams of seismic energy represented in the seismic data have been generated by reflections of source beams of seismic energy emitted from the source such that a given detector beam has been generated by a corresponding a source beam having some source dip at the source location, and wherein the midpoint dip corresponding to the given detector beam arrival is the sum of the detector dip of the given detector beam arrival and the source dip of the source beam corresponding to the given detector beam arrival.

* * * * *